United States Patent [19]

Foss

[11] 4,034,021

[45] July 5, 1977

[54] COPOLYMERS OF PIVALOLACTONE AND ISOPRENE OR BUTADIENE

[75] Inventor: Robert Paul Foss, Hockessin, Del.

[73] Assignee: E. I. Du Pont de Nemours and Company, Wilmington, Del.

[22] Filed: June 25, 1975

[21] Appl. No.: 590,371

Related U.S. Application Data

[60] Division of Ser. No. 413,367, Nov. 6, 1973, Pat. No. 3,907,933, which is a division of Ser. No. 324,502, Jan. 17, 1973, Pat. No. 3,821,331, which is a continuation-in-part of Ser. No. 227,258, Feb. 17, 1972, abandoned.

[52] U.S. Cl. .............................. 260/887; 260/879; 428/524
[51] Int. Cl.$^2$ ...................... C08L 9/00; C08L 13/00
[58] Field of Search ........................... 260/887, 879

[56] References Cited

UNITED STATES PATENTS

| 3,135,716 | 6/1964 | Uraneck et al. | 260/887 |
| 3,418,393 | 12/1968 | King | 260/857 |
| 3,557,255 | 1/1971 | Sharkey | 260/879 |
| 3,907,933 | 9/1975 | Foss | 260/887 |

FOREIGN PATENTS OR APPLICATIONS

| 7,003,074 | 9/1971 | Netherlands | 260/887 |

*Primary Examiner*—J. Ziegler

[57] ABSTRACT

Disclosed herein are new, specifically modified, copolymers of pivalolactone with isoprene and/or butadiene. Also disclosed is a process for making copolymers comprising (1) polymerizing the diene with a lithium initiator and, optionally, metallating the resulting lithiopolydiene with an alkyllithium, (2) carboxylating the resulting polylithiopolydiene by reaction with carbon dioxide, (3) reacting the polymeric lithium carboxylate with tetraalkylammonium hydroxide or halide and (4) reacting the tetraalkylammonium salt with pivalolactone.

9 Claims, No Drawings

COPOLYMERS OF PIVALOLACTONE AND ISOPRENE OR BUTADIENE

CROSS-REFERENCE TO RELATED APPLICATIONS

This is a division of application Ser. No. 413,367, filed Nov. 6, 1973, now U.S. Pat. No. 3,907,933, which is in turn a division of application Ser. No. 324,502, filed Jan. 17, 1973, now U.S. Pat. No. 3,821,331, which is in turn a continuation-in-part of application Ser. No. 227,258, filed Feb. 17, 1972, now abandoned.

BACKGROUND OF THE INVENTION

1. Field of the Invention

This invention relates to specifically modified copolymers derived from pivalolactone

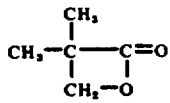

and isoprene and/or butadiene.

2. Description of the Prior Art

ABA type copolymers are taught in Sharkey, U.S. Pat. No. 3,557,255, wherein the A blocks are polypivalolactone and the B block is polyisoprene or polybutadiene. Copolymers taught herein are structurally different from such prior art copolymers in that they contain a

unit between A and B blocks. Processes are nonanalogous.

The copolymers taught in Netherlands 70.03074 are distinguishable from those taught herein on the basis of obvious structural differences in the location of polypivalolactone segments along the backbone, or, on the type linkage by which the segments are attached, or, on the physical properties that characterize them, e.g., melt flow properties. The prior art process differs in several aspects including, inter alia: it begins with a preformed nonlithiated polymer that must first be dissolved; the dissolved polymer, if not intrinsically carboxylated, is carboxylated by reaction with a carboxylic acid or anhydride.

SUMMARY OF THE INVENTION

The novel products of this invention include copolymers (A):

wherein $l$ and $n$ are between about 5 to 4000, and $m$ is between about 25 to 25,000. Preferred values for $l$ and $n$ are about 15 to 200, and for $m$ about 100 to 5,000.

Also included herein are novel copolymers (B):

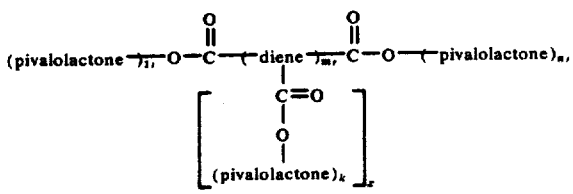

wherein $l'$, $n'$ and $k$ are between about 5 to 4000, $n'$ is between about 25 to 25,000 and $x$ is from about 1 to 350. Preferred values for $l'$, $n'$ and $k$ are about 15 to 200, for $m'$ about 100 to 5,000 and for $x$ about 1 to 50.

Included also are copolymers (C):

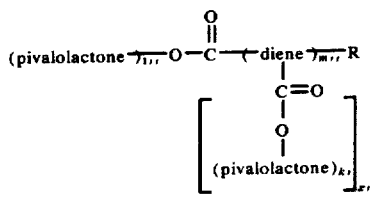

wherein $l''$ and $k'$ are about 5 to 4000, $m''$ is between about 25 to 25,000, $x'$ is from about 1 to 350, and R is alkyl of 1 to 12 carbons. Preferred values for $l''$ and $k'$ are about 15 to 200, for $m''$ about 100 to 5,000 and for $x'$ about 1 to 50.

The various $k$, $l$, $m$ and $n$ subscripts set out above are integers that represent the corresponding number of respective monomer units in the copolymer. The $x$ subscripts are integers that represent the number of randomly located sidechain polypivalolactone segments attached to the polydiene substrate in copolymers (B) and (C). It should be understood that, in copolymers (B) and (C), there is no more than one sidechain polypivalolactone segment for each diene unit.

The molecular weights of the polypivalolactone segments in copolymers (A), (B) and (C) vary between about 500 to 400,000, and the molecular weights of the polydiene segments vary between about 1300 to 1,700,000. Butadiene and isoprene are the contemplated dienes.

Process

The novel process taught herein comprises what is preferably, but not necessarily, a so-called one-pot or continuous process. The reaction process proceeds according to the sequential relationship set out hereafter. The contemplated process is operable to produce a broader range of products than are specifically taught herein. For instance, copolymer types (A), (B) and (C) can be made with $k$, $l$, $m$, $n$, $x$ and R values significantly broader than disclosed. Those skilled in the art, upon reading this disclosure, will understand how to operate the novel process to obtain a wider array of type (A), (B) and (C) copolymers than are specifically set out. Step 1(a) diene monomer + lithium initiator in hydrocarbon solvent → lithiopolydiene, and (b, optional) lithiopolydiene + alkyllithium → polylithiopolydiene. The lithiopolydiene of Step 1(a) may be an α-monolithio- or an α,ω-dilithiopolydiene. The polylithiopolydiene product of Step 1(b) is a multilithiated polydiene containing at least two lithio groups and generally more, e.g., up to about 350 randomly located lithio groups of which no more than two are end groups. The lithium initiator is selected from the group consisting of monolithio compounds which propagate formation of α-monolithiopolydienes, and dilithio compounds which propogate formation of α,ω-dilithiopolydienes. When the lithium initiator is a dilithic compound and Step 1(b) is omitted, copolymer A is produced. When the lithium initiator is a dilithio compound and Step 1(b) is included, copolymer B is produced. When the lithium initiator is a monolithio compound, Step 1(b) must be included and copolymer C is produced.

Step 1(a) is primarily a diene polymerization step and Step 1(b) is solely a metallation (lithiation) step whereby the alkyllithium (complexed with a diamine as will be more fully discussed hereafter) acts to lithiate allylic carbons in the initial lithiopolydiene.

| Step 2 | polylithiopolydiene + $CO_2$ |
|---|---|
| → | lithium salt of polydienepolycarboxylic acid. |
| Step 3 | lithium salt of polydienepolycarboxylic acid + tetraalkylammonium compound (hydroxide or halide) |
| → | tetraalkylammonium salt of polydienepolycarboxylic acid |
| Step 4 | tetraalkylammonium salt + pivalolactone (PVL) |
| → | Copolymer A, |
| → | Copolymer B, or |
| → | Copolymer C in accordance with the particular lithium initiator and subsequent procedure employed in Step 1. |

DETAILS OF THE INVENTION

General Process Parameters

Step 1

The diene polymerization (Step 1a) is carried out in a nonpolar medium in order to obtain a center block of sufficiently high 1,4-content to give good rubber properties in the final product. However, when B or C are the desired copolymers, aromatic-type solvents such as benzene and toluene cannot be used since they interfere with the metallation reaction of Step 1(b). The rate of diene polymerization is primarily dependent upon the polymerization temperature. The preferred conditions include the temperature range from 25° to 100° C. A temperature of about 60° C. is especially preferred for best results. Under these conditions polydienes of narrow molecular weight range are obtained.

Operable monolithio initiators are alkllithiums and include methyllithium, ethyllithium, n-butyllithium, sec-butyllithium, octyllithium and dodecyllithium. The butyllithiums are preferred.

Operable dilithio initiators include: (1) dilithio α-methylstyrene oligomer (Karoly, ACS Polymer Preprints, 10, No. 2, Sept..1969); (2) 1,3-bis(1-lithio-3-methylpentyl)benzene, made by addition of sec-butyllithium to m-divinylbenzene (Kamienski, Polymer Preprints, First Akron Summit Polymer Conference, Symposium on Anionic Polymerization, University of Akron, p.24, June 18-19, 1970), sold under the trademark DiLi-3, registered in the name of Lithium Corporation of America; (3) dilithio isoprene oligomers, (dilithio-isoprene oligomers in benzene-triethylamine solution), see Product Bulletin 191, Lithium Corporation of America; (4) 1,4-dilithio-1,1,4,4-tetraphenylbutane prepared by reacting lithium with 1,1-diphenylethylene (Fetters and Morton, Macromolecules, 2, 453 (1969); and (5) 1,3-bis(1-lithio-1-methyl-2-alkyl)benzene

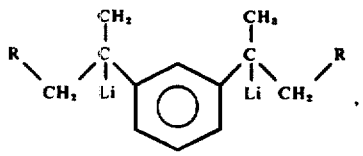

wherein R is an alkyl, prepared by the addition of m-diisopropenylbenzene

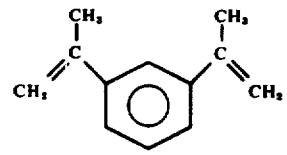

to an alkyllithium. When using this compound as the lithium initiator, its preparation should proceed in a solution of triethylamine and an aliphatic solvent, such as cyclohexane. Typical alkyl lithiums include n-butyl or s-butyl lithiums. Starting with the preferred s-butyllithium results in the desired 1,3-bis(1-lithio-1,3-dimethylpentyl)-benzene

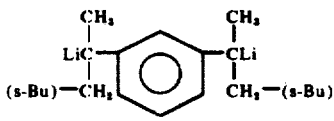

The steric hindrance induced by the 1-methyl groups apparently precludes the addition of further m-diisopropenyl benzene molecules with the concommittant possibility of initiators with several rather than two lithium atoms. These preferred initiators with exactly two lithium atoms can then produce pure α,ω-dilithiopolydienes free of undesired branch chains and permits the development of block copolymers with no sidechains attached to the initiator molecules themselves.

Thus, in general initiator types (2) and (5), especially the latter, represent the preferred initiators, Moreover, it is expected that other useful initiators would include compounds similar to the two preferred types (2) and (5) that can be described more generally as solutions of alpha-lithio substituted dialkylbenzenes and dialkylbenzene oligomers in hexane-triethylamine solution.

In Step 1 it is important to perform Steps 1(a) and 1(b) separately. The diamine complexing agent necessarily used in Step 1(b) should not be present in Step 1(a) since it can promote a competing side reaction involving the diene monomer and the alkyllithium or the lithiopolydiene product which results in formation of polydiene with undesirable 1,2- or 3,4-microstructure. Therefore, any diamine complexing agent employed for Step 1(b) should be added only after completion or near completion of the diene polymerization. After substantially all of the diene is polymerized, the diamine can be added separately, or, in any order, with additional alkylithium or as a preformed complex.

Operable alkyllithium lithiating agents for Step 1(b) include those listed above as monolithio initiators. The alkyllithium and diamine complexing agent can be added separately or together as a mixture. This is done after all diene has been consumed in Step 1(a) in order to preserve the high 1,4- microstructure. The mixture is then allowed to react for up to two hours or longer at about 60° C. to effect metallation.

When copolymer B or C is desired, the alkyllithium for Step 1(b) is added in an amount equivalent to the number of polypivalolactone sidechains desired, exclusive of polypivalolactone end groups.

The damine complexing agent is usually added in an excess amount that for good results may even be as high as about 2.2 equivalents based on the total lithium employed in Steps 1(a) and 1(b). Operable complexing amines include N,N,N',N'-tetramethylethylenediamine (TMEDA), N,N,N',N'-tetraethylethylenediamine, N,N,N',N'-tetrabutyl-1,4-butylenediamine and the like.

Step 2

Carbon dioxide can be added as a solid, gas, or preferably, in solution in a suitable solvent such as tetrahydrofuran (THF). THF is saturated with carbon dioxide ($CO_2$) by bubbling the gas into it under slight pressure. This $CO_2$-saturated solution is then passed into the polyanionic polymer mixture under efficient stirring between room temperature and the temperature employed in Step 1. Alternatively, the polylithiopolydiene solution from Step 1 may be transferred into the $CO_2$-saturated THF with vigorous stirring. Such transfer is preferably effected by applying argon pressure to force the solution of polylithiopolydiene through glass or steel tubing from the first closed reactor to the second. After allowing sufficient time for the carboxylation to be completed, the mixture can be heated to drive off excess $CO_2$. This can also be accomplished by bubbling nitrogen through the mixture or mild evacuation. In this step a small amount of pure THF can be added to the polydiene polyanionic system to reduce the viscosity, if necessary. N,N,N',N'-Tetramethylethylenediamine may also be used to accomplish the task of reducing viscosity. The reduction of viscosity is desirable in that it allows more efficient mixing of carbon dioxide.

Step 3

This process step involves exchange of tetraalkylammonium cations for lithium cations in the polydienepolycarboxylate. The reaction can be illustrated by the equation

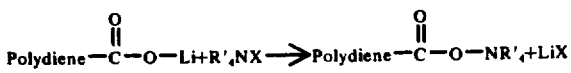

where $R'_4NX$ represents an organic soluble quaternary ammonium hydroxide or halide. In the formula $R'_4NX$, $R'_4N^+$ is a quaternary ammonium ion in which R' is alkyl of 1 to 12 carbons or carbocyclic aralkyl of 7 to 18 carbons, and X is a hydroxyl, chloride, bromide, iodide ion. In the $R'_4N^+$ ion the R' groups can be the same or different alkyl or aralkyl groups. Suitable quaternary ammonium ions are tetramethylammonium, tetraethylammonium, tetra-n-butylammonium, benzyl trimethylammonium and dodecyl trimethylammonium ions. Tetrabutyl ammonium compounds are preferred sources of quaternary ammonium ions. The preferred compounds are tetrabutylammonium hydroxide and tetrabutylammonium chloride, although other salts than the chloride can be used.

The reaction proceeds at temperatures down to about 0° C. and is preferably conducted in the range from room temperature to about 60° C. although higher temperatures can be employed. It is surprising that under these conditions the exchange of cations in the above equation is essentially complete. Instead, an equilibrium condition and the existence of a significant proportion of unchanged $R'_4NX$ in the reaction system would ordinarily be expected. This is an important aspect since in the following Step 4, when pivalolactone (PVL) is present, unchanged $R'_4NX$ in the mixture could initiate undesirable formation of PVL homopolymer.

Although the $R'_4NX$ compound could be added in excess, it might then become necessary to isolate and purify the polymeric quaternary ammonium salt to remove excess or unreacted $R'_4NX$ before addition of pivalolactone. Otherwise, free PVL homopolymer could be formed and could interfere with product properties or, at least, raise the problem of its removal. Excess or unreacted $R'_4NX$ can be removed by precipitation in a nonsolvent for the polymer, steam stripping, etc.

To eliminate the necessity for $R'_4NX$ removal, it is preferred to use no more than an equivalent amount of $R'_4NX$, based on total lithium. It is most preferred to employ less than an equivalent amount of $R'_4NX$. It has been found, in fact, that as little as 20% or less of an equivalent amount of $R'_4NX$ is sufficient to achieve the desired result in the following Step 4.

Step 4

Pivalolactone monomer is added to the tetraalkyl ammonium salt product of Step 3 and polymerized at a temperature between about 0° C. to 80° C. Room temperature is preferred. The polymerization is carried out in a nonpolar solvent such as cyclohexane, benzene, or toluene or in a polar solvent such as tetrahydrofuran or ethylene glycol dimethyl ether or in a combination or polar and nonpolar solvents. The use of polar solvents alone or in combination with nonpolar solvents is preferred since such media provide less viscous, more readily stirrable reaction mixtures.

Surprisingly, when less than the equivalent amount of $R'_4NX$ is used, after the first step of initiation of PVL polymerization has occurred and the quaternary ammonium ion becomes transferred to the carboxylate (anionic) end of a growing polypivlolactone chain there takes place an apparently very rapid transfer between such quaternary ammonium cations and lithium cations at all carboxylate sites. The end result is an essentially equivalent propagation of growing polypivalolactone chains at all carboxylate sites on the polydiene polycarboxylic base. This effect is illustrated in Examples 5, 6 and 7.

Steps 3 and 4 can be combined and if combined the PVL monomer can be added before, during or after addition of the $R'_4NX$ compound, if the latter is used in no more than an equivalent amount, calculated on the lithium in the lithium salt of the polydienepolycarboxylic acid. By adding PVL beforehand a desirable blending of PVL into the mixture can be achieved before its polymerization is initiated by the quaternary ammonium polydienepolycarboxylate. If the PVL is first dissolved in THF and then added, there is an added advantage in reduced tendency for precipitation of the polydiene.

Temperature is quite important should it be desired to combined Steps 3 and 4. Temperatures should be kept at about 50° C. or below and preferably below 30° C., to avoid competing homopolypivalolactone formation by the quaternary ammonium hydroxide or halide. Under these mild conditions the reaction of the quaternary ammonium compound with the lithium salt of the polydienepolycarboxylic acid (the reaction of Step 3), and the reaction of the quaternary ammonium salt formed thereby with pivalolactone are much more rapid than the reaction of pivalolactone with quaternary ammonium compound. Therefore, pivalolactone can be added to the lithium salt of the polydienepolycarboxylic acid before or after the Step 3 addition of the quaternary ammonium compound thereto.

The novel copolymers disclosed herein are useful for various purposes as will be evident to those skilled in the art. As articles of manufacture, uses include elastic fibers, extensible films, general purpose rubbers (tires), high impact strength plastics, injection molded articles, and the like.

DESCRIPTION OF THE PREFERRED EMBODIMENTS

The following Examples are meant to illustrate but not to limit the invention. The Examples are followed by a discussion of the surprising properties displayed by these novel copolymers. In each of the Examples, the making of the corresponding butadiene-containing copolymer can be effected by substitution of equivalent amounts of butadiene for isoprene.

EXAMPLE 1

Pivalolactone/Isoprene/Pivalolactone Copolymer (A)

Step 1(a) Polyisoprene Dilithio $\alpha$-Methylstyrene Oligomer (Initiator)

A small (59 mm × 28 mm) dry glass vial containing a magnetic stirring bar was loaded with 0.15 g of lithium powder in an argon atmosphere. The vial was sealed with a serum stopper, positioned over a magnetic stirrer, and arranged for continuous flowthrough of argon via two hypodermic needles piercing the stopper. With argon flowing and stirrer running, toluene (5 ml), purified $\alpha$-methylstyrene (2 ml) and dry tetrahydrofuran (0.6 ml) were introduced successively through another hypodermic needle, which was then removed. The contents of the vial were stirred for 30 minutes at room temperature and then allowed to stand for at least 20 minutes to permit excess lithium to float to the surface so that samples of fluid product drawn into a syringe through an inserted hypodermic needle would be essentially free of metallic lithium.

Polymerization

A dry 250 ml flask containing a magnetic stirring bar and argon under slight positive pressure was loaded with 50 ml of dry toluene and 15 ml (ca 10 g) of isoprene. The isoprene had been previously purified and kept under argon by drying regular isoprene over calcium hydride, treating it with butyllithium and allowing of polymerization to distill till excess monomer through a stillhead into a dry receiver. The mixture in the reaction flask was stirred and heated by means of an external water bath at 60° C. A 0.6-ml quantity of the dilithio $\alpha$-methylstyrene oligomer prepared in Part (a) was injected into the flask, the first 0.2 ml slowly and the remainder rapidly. The heating bath was removed as soon as the initiator had been added and stirred into the reaction mixture. Polymerization began very rapidly, as indicated by increase in viscosity. The solution was allowed to stir 45 minutes to insure substantially complete polymerization of the isoprene. (A polyisoprene previously prepared in identical fashion was found to have a number average molecular weight of about 40,000 ).

Step (2) Carboxylation of the Polyisoprene

Dry tetrahydrofuran (80 ml) was added to the dilithiopolyisoprene prepared in step (1) and the mixture was stirred to dissolve the viscous polymer. A dry glass inlet tube was inserted through a side arm of the polymerization flask and carbon dioxide was bubbled into the polymer solution for 30 minutes. The solution became more viscous and its yellow color was quickly discharged. Stirring was continued for about 2 hours after the carbon dioxide flow was stopped, and then an additional 20 ml of tetrahydrofuran was added to reduce the viscosity of the solution.

Step (3) Tetrabutylammonium Salt of Carboxylated Polyisoprene

The solution of the dilithium salt of polyisoprene-$\alpha,\omega$-dicarboxylic acid prepared in Step (2) was treated with 12 g of a 25% solution of tetrabutylammonium hydroxide in methanol. The reaction underwent an immediate marked decrease in viscosity, and it was stirred overnight at 35° C. The reaction mixture was then subjected to three successive steam distillations by introducing steam through a glass inlet tube, the precipitated polymer in the flask being redissolved twice in tetrahydrofuran between steamings. The polymer was next dried by dissolving it in benzene at the boiling point and removing water via the azeotrope with boiling benzene. The residual benzene in the dried solution was substantially removed under reduced pressure and the residue was taken up in 150 ml of dry tetrahydrofuran.

Step (4) Polymerization of Pivalolactone

A solution of 4 ml of pivalolactone in 50 ml of tetrahydrofuran was added with stirring at room temperature to the solution of tetrabutylammonium salt of $\alpha,\omega$-polyisoprenedicarboxylic acid prepared in Step (3). A gel formed; it was allowed to stand overnight at room temperature and was then thoroughly mixed with ethanol containing acetic acid and a small amount of phenyl-$\beta$-naphthylamine antioxidant. The precipitated polymer was filtered off and dried in a vacuum oven at approximately 60° C. The dried polymer weighted 12.9 g (92% yield, based on 10 g of isoprene and 4 g of pivalolactone used in the preparation). A 7-mil film of the polymer, pressed at 212° C under 1000 psi pressure, was strong and elastomeric.

An 8.35-g portion of the above polymer was refined by extraction for three days with benzene to remove any isoprene homopolymer. The undissolved highly swollen polymer was separated from fluid benzene solution and agitated in a blender with ethanol containing phenyl-$\beta$-naphthylamine. The resultant solid was filtered and dried to give 7.2 g of recovered benzene-insoluble polymer which analyzed for 78.80% and 10.42% hydrogen (indicating a block copolymer containing 33.4% by weight of pivalolactone). A film of the refined polymer, pressed at 215° C and 2500 psi pressure, gave strips exhibiting approximately 20% cold draw. A strip of the film was mechanically drawn in a 100% strain at a rate of 50% per minute and then allowed to relax for 18 hours; the strip then showed a tensile strength of 730 psi at a break elongation of 540%.

EXAMPLE 2

Pivalolactone/Isoprene/Pivalolactone Copolymer (A)

The stepwise procedure of Example 1 was followed as described, except that steps (3) and (4) were altered as follows:

Step (3) Tetrabutylammonium Salt of Polyisoprenedicarboxylic Acid

The solution of the dilithium salt of $\alpha,\omega$-polyisoprenedicarboxylic acid prepared in step (2) was treated with 10 ml of 1M tetrabutylammonium hydroxide in methanol and the mixture was stirred overnight at room temperature. Most of the solvent was then removed under reduced pressure and the residue was mixed with ethanol in a blender to effect precipitation of the polymer in subdivided form. The slightly sticky polymer was separated and worked a second time with fresh ethanol in the blender. The polymer was again separated, then dissolved in benzene. Benzene, water and ethanol were removed from the solution under reduced pressure. The dry residual polymer was then dissolved in 200 ml of tetrahydrofuran.

Step (4) Formation of Polypivalolactone

Pivalolactone (5.5ml) was added at room temperature with stirring to the solution of tetrabutylammonium salt of polyisoprenedicarboxylic acid prepared in Step (3). A gel formed rapidly. It was allowed to stand overnight at room temperature, was then mixed thoroughly with 300 ml tetrahydrofuran to facilitate dissolution of soluble polymer into the non-gel phase. The gel was separated by centrifugation and mixed thoroughly with ethanol containing acetic acid and phenyl-$\beta$-naphthylamine. The polymer thus precipitated was filtered and dried under vacuum at 60° C.

The dried polymer (13.2 g, 85% yield analyzed for 77.49% carbon and 10.49% hydrogen, which corresponds to a copolymer containing 37.4% by weight of pivalolactone. A clear filmm pressed at 215° C. and 1500 psi pressure was found to cold draw to a white, opaque, strong elastomer.

EXAMPLE 3

Pivalolactone/Isoprene/Pivalolactone Copolymer (A)

In this example the general procedure of Example 2 was followed, the major change being the use of DiLi-3 (A registered trademark of Lithium Corporation of America) as the initiator in step (1): 1,3-bis(1-lithio-3-methylpentyl)-benzene, made by addition of sec-butyllithium to m-divinylbenzene.

Step (1a) Polyisoprene

A reaction flask was placed in a water bath at 60° C and loaded with a solution of 15 ml (ca 10 g) of isoprene in 50 ml of cyclohexane, and 0.6 ml of 0.85N initiator was then added. Six minutes after adding the initiator, polymerization of the isoprene became so vigorous that the heating bath was replaced with an ice bath in order to control the reaction. After 1 hour and 42 minutes, 100 ml of dry tetrahydrofuran was added to the very viscous polyisoprene solution.

Step (2) Lithium Salt of Polyisoprenedicarboxylic Acid

When the polyisoprene of step (1) had dissolved in tetrahydrofuran (in about 4 minutes), dry carbon dioxide gas was bubbled through the solution for 1.5 hours while the flask was cooled in an ice bath. This was followed by bubbling nitrogen through the viscous solution to remove most of the excess carbon dioxide.

Step (3) Tetrabutylammonium Salt Formation

Ten milliliters of 1 molar tetrabutylammonium hydroxide in methanol was added to the solution of polymeric lithium salt and the resulting low viscosity solution was stirred overnight at room temperature. Most of the solvent was removed under reduced pressure and the polymeric tetrabutylammonium salt product was then precipitated in a blender with ethanol. The polymer was filtered, worked a second time in the blender with ethanol, recovered by centrifuging, and dissolved in hot benzene. The benzene was removed under reduced pressure, the polymeric salt was dissolved in 200 ml of tetrahydrofuran, and the solution was filtered.

Step (4) Pivalolactone Polymerization

Pivalolactone (5.5 ml) was added at room temperature with stirring to the solution of tetrabutylammonium salt of polyisoprenedicarboxylic acid from step (3). A gel formed, was washed with 600 ml of tetrahydrofuran in a blender, and the resulting fluid was centrifuged. The gel which separated was added to ethyl alcohol containing some acetic acid and phenyl-$\beta$-naphthylamine to precipitate the block copolymer. The polymer, after filtering and drying, weighed 0.85 g and was found to contain 75.42% carbon and 9.92% hydrogen, which indicates a copolymer containing 45.7% pivalolactone by weight. A 10 to 11-mil film of this polymer, pressed at 215° C and 5000 psi pressure, had a tensile strength of 2341 psi at 1214% elongation. A sample of the same film was hand-drawn and exercised, after which is had a tensile strength of 4894 psi at a break elongation of 528%. An x-ray diffraction pattern of the exercised film indicated that the polypivalolactone portion was crystalline but substantially unoriented. A similar film of the polymer, after being stored for about 3 weeks and then drawn, showed an average tensile strength of 3139 psi at 417% elongation at room temperature and of 1800 psi at 415% elongation at 100° C.

Making of Press-Spun Fibers

Additional samples of pivalolactone/isoprene/-pivalolactone (ABA) block copolymer were prepared by the procedure of Example 3 with only slight changes: In step (1) 75 ml of cyclohexane was used, and at the end of step (2) the solution was centrifuged rather than filtered. Two such products, analyzing for 41.7% and 44.8% pivalolactone, were blended in the amount of 7 and 8 g, respectively, and the blend was molded at 220° C and 3000 psi pressure to form a plug ⅞ inch in diameter. Fibers were spun from this plug through a single 15-mil spinneret orifice at 210°–215° C and about 12,000 psi pressure, an exit rate of 12 feet per minute, and a windup rate of 40 feet per minute, thus providing a draw ratio of 3.3 during the spinning. The rubbery monofilament toward a tenacity of 0.41 per denier at a break elongation of 345%, and after heat-setting for 1.5 hours in boiling water it had a tenacity of 0.63 g per denier at a break elongation of 154%. Another sample of the ABA polymer containing 43.9% pivalolactone was pressed into a film at 220° C and 1000 psi pressure; and strips of this film, after being drawn and exercised, showed an average tensile strength of 7570 psi at an average elongation of 285%.

EXAMPLE 4

Pivalolactone/Isoprene/Pivalolactone Copolymer (A)

In this example the general procedure of Example 3 was followed with modifications which allowed all steps to be carried out in the original reactor without removal or isolation of any product except the final block copolymer.

Step (1a)

A 250-ml flask equipped with a magnetic stirring bar, a reflux condenser and a gas inelt tube was loaded with 75 ml of cyclohexane and 15 ml of purified isoprene under argon. DiLi-3 (0.6 ml, 0.86N) initiator was added and the mixture warmed to 55° C for one hour during which the isoprene polymerized to give a highly viscous red-colored solution. The heat was removed and the reaction mixture allowed to come to room temperature for 30 minutes.

Step (2)

The reaction mixture was then cooled to 0° C and 100 ml of tetrahydrofuran, previously saturated with dry carbon dioxide under 4 psig pressure, was added. The mixture was allowed to warm to 25° C, during which time its red color faded and following some brief initial gellation its viscosity dropped to a fairly low level.

Step (3)

After about 90 minutes, during which time the homogeneous solution became colorless, 0.13 ml of tetramethylethylenediamine was added and the solution viscosity dropped further. The solution was then reheated to 60° C. for 15 minutes and the flask vented with nitrogen to expel excess carbon dioxide. Tetrabutylammonium hydroxide (0.54 ml, an amount equivalent to the DiLi-3used) was added and the mixture kept at about 60° C. for 0.5 hour. The viscosity of the solution showed a further great decrease immediately after adding the tetrabutylammonium hydroxide. The color immediately turned to a yellow amber which gradually faded to a very pale member.

Step (4)

After 0.5 hour at 60° C., the solution was cooled to room temperature and 5.5 ml of pivalolactone was added. The resultant mixture was warmed slightly, and in about 15 minutes gelation occurred and it became too viscous to stir. It was let stand at room temperature overnight, and then was mixed with 250 ml of tetrahydrofuran. The mixture was transferred to a blender, and after being blended it was centrifuged. Extraction with THF showed no homopolyisoprene. The mixture was finally processed in a blender with about an equal volume of ethanol containing acetic acid and phenyl-$\beta$-naphthylamine antioxidant. The shredded polymer was separated on a filter and dried at room temperature under vacuum; yield, 12.5 g (80%, based on starting materials). Analysis by I. R. indicated approximately 45% pivalolactone in the polymer.

Test samples of the polymer were pressed into films at 230° C. The clear films were strong and highly resilient elastomers, but tended to become opaque upon being drawn.

EXAMPLE 5

Pivalolactone/Isoprene/Pivalolactone Copolymer (A)

In this example the one-pot procedure of Example 4 was followed. However, addition of tetramethylethylenediamine as a lithium salt complexing agent was omitted and only a 0.5 equivalent of tetrabutylammonium hydroxide was used.

The process was carried out in a 500-ml flask and the following details are noted.

Step (1a) Isoprene Polymerization

Cyclohexane, 250 ml; isoprene, 30 ml; DiLi-3, 8.35 × $10^{-4}$ eq. Reaction at 60° C. for 40 minutes, then one hour at room temperature. Calculated molecular weight for quantitative reaction: 50,000.

Step (2) Carboxylation

Tetrahydrofuran solvent, 50 ml; tetrahydrofuran saturated with $CO_2$, 150 ml. Mixture at room temperature for 10 minutes then at 60° C. for 1 hour.

Step (3) Salt Transfer

Tetrabutylammonium hydroxide, 4.15 × $10^{-4}$ eq. Viscosity and color changes were essentially as in Example 4.

Step (4) Polypivalolactone

Pivalolactone, 7.0 ml, was added slowly at 60° C. over 3 minutes. The mixture gelled in 7 minutes and cooled to room temperature in one hour. No homopolyisoprene was found upon extraction with THF. This proves chain transfer between $Li^+$ and $^+NR_4$ since without chain transfer, statistically there would be 25% homopolyisoprene. The product (83.5% yield) contained 30% pivalolactone as determined by elemental analysis. Films and fibers were prepared, and were found to be strong, snappy and elastomeric.

EXAMPLE 6

Pivalolactone/Isoprene/Pivalolactone Copolymer (A)

In this example the general procedure of Example 5 was followed, except that pivalolactone was added prior to tetrabutylammonium chloride, which was used in place of the hydroxide.

The process was carried out in a 500-ml flask and the following details are noted.

Step (1a) Isoprene Polymerization

Cyclohexane, 300 ml, isoprene, 30 ml, DiLi-3, 8.35 × $10^{-4}$ eq., were combined and warmed for 40 minutes at 60° C. The reaction mixture was then allowed to come to room temperature in an hour.

Step (2) Carboxylation

Tetrahydrofuran solvent, 25 ml, and then tetrahydrofuran saturated with $CO_2$, 100 ml, were added, the reaction proceeded 5 minutes at room temperature and then 1 hour at 60° C.

Steps (3) and (4) Salt Transfer/Polypivalolactone

Pivalolactone (7.0 ml) was added at room temperature with no change in viscosity. Tetrabutylammonium chloride (4.17 × $10^{-4}$ eq.) dissolved in tetrahydrofuran was added with a significant decrease in viscosity occuring on addition. The viscosity began to increase within 4 minutes and a gel formed within 15 minutes. The reaction was allowed to stand overnight. The product (84% yield) contained 25.6% pivalolactone as determined by elemental analysis and no homopolyisoprene as determined by extraction with THF. It was readily moldable from a fluid melt into a strong extensible elastomeric film.

EXAMPLE 7

Pivalolactone/Isoprene Copolymer (C)

Step (1a) Polyisoprene Substrate

Two simultaneous preparations were carried out under argon in 250-ml reactors (A and B) equipped wih magnetic-stirrers, reflux condensers and gas inlet tubes. Each flask was charged with 100 ml of cyclohexane and 10 ml (0.1 mole) of isoprene, and the 0.056 ml (6.8 × $10^{-5}$ mole) of 1.21N sec-butyllithium solution. The mixtures were stirred at 60° C for 1.5 hours. Tetramethylethylenediamine (0.1 ml 1.0 × $10^{-3}$ mole) was then added and the mixtures kept at 60° C for an additional half hour after which they were vented while at reflux to remove any unpolymerized isoprene.

Step (1b) Polylithiation of Substrate

The monomer-free solutions of monolithiopolyisoprene were treated with additional 0.224 ml (2.7 × $10^{-4}$mole) portions of 1.21N sec-butyllithium and the reaction was allowed to proceed for 2 hours at 60° C. (the total equivalents of RLi in each reactor was now 3.38 × $10^{-4}$ moles). The color of the mixtures slowly turned to deep amber, their viscosities increased, and butane was evolved. Periodic observation indicated that the butane evolution, color changes and viscosity increases were substantially completed with the first hour.

Step (2) Carboxylation of Lithiated Substrate

Carbon dioxide was bubbled into the reaction mixtures. Stiff gels were formed. Tetrahydrofuran (50ml) was added to loosen the gels, the resulting colorless mixtures were kept at 60° C. for 30 minutes, and then nitrogen was bubbled through while heating to remove excess carbon dioxide.

Step (3) Salt Exchange on Carboxylated Substrate

In flask A was placed 0.352 ml (3.38 × $10^{-4}$ mole), i.e., 100% of the lithium equivalent, and in flask B 0.176 ml (1.69 × $10^{-4}$mole), i.e., 50% of the lithium equivalent, of 25% tetrabutylammonium hydroxide in methanol. The mixtures were heated to 60° C. for 15 minutes and then cooled to room temperature.

Step (4) Polypivalolactone

Pivalolactone (1.7 ml) was added to each flask, and the mixtures were warmed briefly and then let stand overnight without stirring. Tight gels were formed which were macerated with tetrahydrofuran in a blender The resulting fluid mixtures were centrifuged and the tetrahydrofuran supernatant portions were removed. The remaining compressed gels were thoroughly mixed with ethanol containing acetic acid and phenyl-β-naphthylamine antioxidant and the precipitated solids were filtered off and dried under vacuum.

Examination of the final products showed them to be essentially identical. Elemental analysis indicated that both contained about 23% pivalolactone. Their I.R. spectra were identical, and they could be pressed into strong elastomeric films. The films showed elongations in excess of 1500%, very little cold draw, and tensile strengths of 2500 psi at break. When heated above 200° C. they melted rather sharply and flowed freely. The similarity of products indicated chain transfer had made all polypivalolactone segments equivalent.

EXAMPLE 8

Pivalolactone/Isoprene Copolymer (C)

In this example, the general procedure of Example 7 was followed; the process was run in a 500-ml reactor and the following details are noted.

Step (1a) Isoprene Polymerization

Cyclohexane, 250 ml; isoprene, 50 ml; sec-butyllithium, 0.3 ml of 1.27N solution (3.8 × $10^{-4}$mole), added slowly; temperature, 50° C; time to observable viscosity increase, 10 minutes, tetraethylenediamine, 0.7 ml (6 × $10^{-3}$ mole), added after 1.5 hours, accompanied by significant drop in viscosity and formation of deep yellow color; total reaction time, 2 hours, followed by venting with argon.

Step (1b)Lithiation of Polyisoprene Substrate

Secbutyllithium, 1.5 ml (1.9 × $10^{-3}$ mole) of 1.27N solution added slowly; temperature, 50° C; reaction time, 2 hours.

Step (2) Carboxylation of Polylithiated Substrate

Started at room temperature by adding 200 ml of tetrahydrofuran previously saturated with carbon dioxide. Initially formed gel broke up and amber color faded with formation of colorless viscous solution, all within 10 minutes. The mixture was heated to 50° C.; reaction time, 30 minutes. Excess $CO_2$ was removed by venting with nitrogen.

Step (3) Salt Exchange on Carboxylated Substrate

Tetrabutylammonium hydroxide, 1.2 ml of 25% solution in methanol (9.8 × $10^{-4}$ mole) about ½ eq. based on total lithium, was added over 7 minutes. The reaction proceeded at 50° C. for 30 more minutes. The low viscosity solution was then cooled to room temperature.

Step (4) Polypivalolactone

Pivalolactone, 11.0 ml. was added slowly at room temperature. A gel formed within about 13 minutes. The mixture was allowed to stand overnight to insure completion of the reaction. The precipitated and dried product, in 100% yield, contained 24.9% by weight of pivalolactone. It was moldable and melt spinnable into elastic fibers at 250° C. Film samples were elastomeric with unusually high elongations of 3600% to 4500% at break and showed essentially complete recovery after an initial draw without breaking.

EXAMPLE 9

Pivalolactone/Isoprene Copolymer (B)

In this example the general procedure of Examples 7 and 8 were followed, but DiLi-3 was used instead of sec-butyllithium as initiator in the formation of the polyisoprene substrate.

Step (1a) Isoprene Polymerization

Cyclohexane, 300 ml; isoprene, 30 ml (20.4 g, 0.3 mole); DiLi-3, 0.93N, 0.5 ml (4.65 × $10^{-4}$ eq.); temperature, 60° C; time, 1.5 hours.

Step (1b) Lithiation of Polyisoprene

Tetramethylethylenediamine, 0.55 ml (3.82 × $10^{-3}$ mole); temperature, 60° C; sec-butyllithium, 1.27N, 1.0 ml (1.27 × $10^{-3}$ eq.), added slowly after 20 minutes at 60° ; total time, 2,33 hours.

Step (2) Carboxylation of Lithiated Polyisoprene

At room temperature, tetrahydrofuran (25 ml) followed by tetrahydrofuran previously saturated with $CO_2$ (150 ml); heated to 60° C; reaction time at 60° C, 0.5 hour.

Step (3) Salt Exchange on Carboxylated Substrate

Tetrabutylammonium hydroxide, 1.04 ml (8.35 × $10^{-3}$ mole); temperature, 60° C; time, 0.5 hour.

Step (4) Polypivalolactone

Pivalolactone, 8.6 g in 25 ml of tetrahydrofuran, was added at room temperature and reacted overnight. The elastomeric product, 24.4 g (84.0% yield), contained 33.7% pivalolactone by elemental analysis.

EXAMPLE 10

Pivalolactone/Isoprene Copolymer (B)

In this example the general procedure of Example 9 was followed except that tetrabutylammonium chloride was used instead of tetrabutylammonium hydroxide in the salt (ion) exchange step on the carboxylated substrate. The following details are noted.

Step (1a) Isoprene Polymerization

Cyclohexane, 300 ml; isoprene, 30 ml (20.4 g, 0.3 mole); DiLi-3, 0.93N, 0.9 ml (8.38 × $10^{-3}$ eq.); temperature, 60° C; time, 1.5 hours.

Step (1b) Lithiation of Polyisoprene

Tetramethylethylenediamine, 0.7 ml (4.8 × $10^{-3}$ eq.); temperature; 60° C; secbutyllithium, 1.27N, 1.0 ml (1.27 × $10^{-3}$ eq.), added after 20 minutes at 60° C; total time, 2.33 hours.

Steps (2) and (3) Carboxylation/Salt Exchange

Room temperature; added 150 ml $CO_2$-saturated tetrahydrofuran containing 0.39 g (1.4 × $10^{-3}$ eq) tetrabutylammonium chloride; time, 1 hour.

Step (4) Polypivalolactone

Pivalolactone, 8.6 ml in 25 ml of tetrahydrofuran, was added at room temperature and reacted overnight. The elastomeric product, 23.0 g (80% yield), contained 37.4% pivalolactone.

The copolymer obtained in this example was an outstanding moldable and spinnable elastomer. A 200-denier filament was spun at 264° C. through a single hole 15 mil spinneret from a ¾ inch plug under 500 psi. The copolymer was remolded several times without loss of properties. In fact, both fibers and film gained in tensile strength upon working. Working included initial cold drawing after which the copolymers recovered substantially completely.

EXAMPLE 11

Pivalolactone/Isoprene Copolymer (B)

Step 1(a) - Polyisoprene

Preparation of the 1,3-Bis(1-lithio-1,3-dimethlpentyl)benzene initiator

A dry quart bottle is flushed with argon and stoppered with a rubber septum through which an argon breather tube is inserted. 440 ml of sodium-dried cyclohexane, 21 ml of twice distilled and butyllithium-dried triethylamine, and 38.4 ml (50 meq) of 1.3 N s-butyllithium is placed in this bottle. To this mixture is slowly added 4.34 ml (50 meq) of freshly distilled, butyllithium-dried m-di isopropenylbenzene. The reaction mixture is held for 1-2 hours at room temperature, the breather tube removed, and the resulting 0.1 N solution then placed in a refrigerated drybox unitl ready for use. Normally the catalyst ages for a couple of days to insure complete reaction of the diisopropenyl compound with butyllithium.

Polymerization

A flame-dried 2-liter reactor is fitted with a sealed top, a T-tube for maintaning a dry argon atmosphere, a vibromixer stirrer, and a septum-stoppered inlet port. Into this reactor are placed 900 ml of sodium-dried cyclohexane and 120 ml (80 g) of butyllithium-dried isoprene. The mixture is heated to 50° C. and charged with 64 ml of the above 0.1 N 1,3-bis(1-lithio-1,3-dimethylpentyl)benzene initiator solution. The reaction mixture reaches 56° C., the heating bath is removed and a cooling bath applied in order to maintain the temperature at about 52° C. After 47 minutes and the subsidence of the reaction, a further application of the heating bath maintain the reactor temperature at 53° C. The reaction proceeds for 2 hours, during which time essentially all the isoprene reacts. At this time the reaction mixture is highly viscous due to association of the lithiated chain end of the $\alpha,\omega$-dilithiopolyisoprene.

The small amount of triethylamine present enhances the reaction rate but has no adverse effect on the polydiene microstructure which appears to be greater than 90 percent in the total 1,4-content.

After the completion of the diene polymerization, 0.50 ml of tetramethylethylenediamine (TMEDA), distilled from a mixture with metallic sodium, is added to the reaction mixture. The viscosity immediately drops as the lithium groups dissociate through complexing with the TMEDA. The color also changes from a very pale ginger to deep yellow. The reaction proceeds for an additional 10 minutes to allow the consumption of any residual isoprene monomer by the activated polymeric dianions.

Step 1(b) —Lithiation of Polyisoprene

A mixture of 35 ml of dry cyclohexane, 2.7 ml of TMEDA and 5.2 ml of 1.45 N n-butyllithium is then added to the reaction mixture to effect metallation of the polymer backbone. The mixture, stirred for 1 hour at 53° C., gives a clear, deep amber, polydienepolyanionic solution. The reaction then cools to 25° C. in preparation for transfer to a carbon dioxide-saturated THF solution.

Step 2 —Carboxylation of Lithiated Polyisoprene

In a second 2-liter reactor is placed 900 ml of sodium-dried THF saturated with carbon dioxide. The polydienepolycarbanion solution is then transferred from the first to the second reactor through a glass transfer tube by pressurizing the first reactor with argon, with vigorous stirring during the transfer to maximize contact of carbanions with excess carbon dioxide and thus prevent crosslinking by ketone formation. Excess carbon dioxide is removed from the resulting clear, colorless viscous solution by mild evacuation and vigorous stirring. Finally, additional THF is added to further reduce the viscosity of the polymer mixture, now weighing 1658 gm.

Step 3 —Salt Exchange on Carboxylated Substrate

A 196 gm. portion of the above solution, containing 9.4 of polyisoprene with 1.65 meq. of lithium carboxylate is transferred to a third reactor. To this is added 2.3 ml of 0.36 N tetrabutylammonium chloride in THF (0.83 meg); and the mixture stirred for 23 minutes to allow for the establishment of equilibrium.

Step 4 —Polypivalolactone 8.7 gm. of the pivalolactone monomer is dissolved in 25 ml of THF and slowly added to the polymer solution. The mixture is stirred at room temperature for 28 minutes, at which time gelation occurs. The gelled reaction mixture, after sitting overnight, is blended with an additional 225 ml of THF and then precipitated by adding 400 ml of 2B ethanol. The polymer is filtered, washed three times with 50 ml aliquots of ethanol, and then swollen with 50 ml of benzene containing 90 mgm. of phenyl $\beta$-naphthylamine antioxidant. A vacuum at 80° C. removes the benzene and yields a 17 gm. sample of block graft polymer. The calculated composition of this sample is:

a. 25,000 g/m polyisoprene molecular weight, b. 3.7 total carboxylate graft sites including ends, c. 48% pivalolactone, each segment having a degree of polymerization (DP) of 53. The melted polymer displays high fluidity.

Preparation of Elastomeric Fiber

The above polymer is molded into a ⅜ inch diameter plug at 200° C. and spun from this in a 2inch long press spinneret having a 20 mil orifice, with a hot zone maintained at 276° C. The extruded fiber is exercised by successive drawing and relaxation to develop optimum strength. Testing for tensile strength and elongation with Instron and Suter testing machines give the results below. Differences in ultimate test values probably derive from differences in jaw design and testing technique.

| Fiber Test Data | | |
|---|---|---|
| Tensile at break | 0.47 g/d | Instron |
| | 0.78 g/d | Suter testor |
| Elongation at break | 266% | Instron |
| | 340% | Suter testor |
| Load Power at 50% elongation | 42 mg/ed | |
| Load Power at 90% elongation | 84 mg/ed | |
| Unload Power at 50% elongation | 27 mg/ed | |
| Unload Power at 90% elongation | 70 mg/ed | |
| Permanent set 8.5% | | |

Table 1 and 2 and Discussion of Copolymer Properties

All of the novel copolymers are readily injection moldable and melt spinnable at temperatures of about 250° C. to 275° C. As will be seen from Tables 1 and 2 that follow, the novel copolymers are characterized by good elongation properties, high tensile strengths and by high melt indices at temperatures of 250° C. and above. It has been found that there is little or no flow at temperatures of 200° C. and below. In fact, it is especially characteristic of the novel copolymers, regarding melt flow properties, that they have a melt index of essentially zero at about 180° C. and below, and a melt index of at least 2.0 at 250° C. and above (ASTM D 1238-57T).

The novel copolymers are also characterized by moderately narrow molecular weight ranges originating in the polydiene substrate. It has been found that they have dispersities between about 1.0 to 2.0. These desirable molecular weight distributions influence melt viscosity and tensile strength properties. See F. W. Billmeyer, Textbook of Polymer Science, Interscience Publishers, 1966, pps. 208–211; and, J. Brandrup et al., Polymer Handbook, Chapter VI-50; J. F. Rudd, J. Poly. Sci. 44, 459–470 (1960).

Dispersities determined for the copolymers made by the procedures of the Examples are as follows: Examples 1 to 3, between 1.3 to 1.6; Examples 4–6 and 9–10, between 1.6 to 1.7; Examples 7–8, between 1.0 to 1.3.

It is a most interesting facet of this invention that exercising copolymer fibers and films, e.g., cold-drawing, pulling, kneading, etc., increases the tensile strength thereof. As can be seen from Table 2, all copolymer samples exhibit very high elongation properties. It can also be seen that already good tensile strengths are greatly improved by exercising, defined as working specifically by successively drawing and relaxing the fibers and films. Furthermore, and surprisingly, exercised and strengthened elastomers retain stretchability and snapback properties.

Without wishing to be bound by this explanation, it is hypothesized that exercising increases tensile strength by causing molecular orientation of the polydiene segments as well as of the polypivalolactone segments. Exercised fibers, filaments, films or articles of manufacture such as molded, pressed or spun articles are included within the scope of this invention.

TABLE 1

Properties of Copolymers[1] Having Polyisoprene Block of Approximately 50,000 M.W.

| Sample No. | Copolymer Type | Wt. % PVL | Form | Tested at °C. | Tensile strength psi or g/d | Elong. at break % | Melt Index[2] Temp °C. | Rate of flow (g/10 min.) |
|---|---|---|---|---|---|---|---|---|
| 1 | (A) | 43.9 | film | 25 | 7570 | 285 | — | — |
| 2 | (A)[3] | 45.7 | film | 25 | 3050 | 415 | — | — |
| 3 | (A)[3] | 45.7 | film | 100 | 1800 | 415 | 250 | 5.3 |
| 4 | (A) | 28.5 | — | — | — | — | 250 | 8.0 |
| 5 | (A)[4] | 28.5 | — | — | — | — | 200 | 0 |
| 6 | (B)[5] | 46.5 | — | — | — | — | 260 | 34 |

[1]Made in accordance with the novel process of this invention for the particular type of copolymer, i.e., (A) or (B)
[2]ASTM test No. D 1238-57T. All polymers preheated approximately 1 hr. at indicated temperature prior to making test.
[3]Samples 2 and 3 were from the same copolymer, that of Example 3.
[4]Same copolymer as Sample 4.
[5]Calculated to have 3 polypivalolactone-containing sidechains.

TABLE 2

Properties[1] of Copolymers[2] Having the Indicated Polyisoprene Molecular Weights

| Sample No. | Copolymer type/ Ex. No. | M.w. of polyisoprene ($M_n$) | No. of PVL sidechains | Equiv. of tetraalkylammonium salt based on total Li | % PVL | Degree of polymerization PVL | Form | Press-temp or spinning temp °C. | Tensile strength psi or g/d | elong. at break % | Remarks |
|---|---|---|---|---|---|---|---|---|---|---|---|
| 7 | (C)/8 | 100,000 | 5 | 0.43 | 24.9 | 48 | film | 260 | 1645 | 4800 | unexercised |
| 8 | same | | | | | | film | 260 | 5100 | 3200 | exercised |
| 9 | same | | | | | | fiber | 250 | 0.24g/d | 946 | drawn and heat set |
| 10 | same | | | | | | fiber | 250 | 0.15g/d | 2335 | as spun |
| 11 | (C) | 100,000 | 5 | 0.43 | 24 | 48 | film | 250 | 2700 | 4200 | unexercised |
| 12 | (A) | 50,000 | none | 0.50 | 27 | 84 | film | 260 | 1440 | 4600 | unexercised |
| 13 | same | | | | | | film | 260 | 4650 | 2700 | exercised |
| 14 | (A) | 20,000 | none | 0.43 | 41 | 60 | film | 270 | 450 | 500 | unexercised |
| 15 | (A)/5 | | | | | | film | 260 | 1330 | 4600 | unexercised |
| 16 | same | | | | | | film | 260 | 2620 | 2600 | predrawn 1 cycle |
| 17 | (A)/6 | 50,000 | none | 0.5 | 28 | 90 | film | 260 | 1080 | 4100 | unexercised pressed on Al |
| 18 | same | | | | | | film | 260 | 850 | 3800 | unexercised pressed on Teflon |

TABLE 2-continued

Properties[1] of Copolymers[2] Having the Indicated Polyisoprene Molecular Weights

| Sample No. | Copolymer type/ Ex. No. | M.w. of polyisoprene ($M_n$) | No. of PVL side-chains | Equiv. of tetra-alkylammonium salt based on total Li | % PVL | Degree of polymerization PVL | Form | Press-temp or spinning temp °C. | Tensile strength psi or g/d | elong. at break % | Remarks |
|---|---|---|---|---|---|---|---|---|---|---|---|
| 19 | same | | | | | | film | 260 | 1770 | 3300 | exercised |
| 20 | (B)/9 | 90,000 | 3 | 0.5 | 33.7 | 53 | film | 280 | >5100 | 2600 | exercised |
| 21 | (C) | 100,000 | 5 | 0.5 | 26 | 44 | film | 260 | 5350 | 1800 | exercised |
| 22 | (B)/10 | 50,000 | 3 | 0.5 | 37.4 | 50 | film | 270 | 2600 | 2600 | unexercised |
| 23 | same | | | | | | film | 270 | 11000 | 1500 | exercised |
| 24 | same | | | | | | film | 270 | (9000–15000) | (1200–1500) | exercised |
| 25 | same | | | | | | fibers | 265 | 0.47 | 700 | exercised |
| 26 | same | | | | | | fibers | 265 | 0.5–0.8 | 600–1000 | exercised |

[1]Tensile and elongation measurements were made both on a Scott Rubber Tensile Tester with a crosshead speed of 6600%/min. and on an Instron Tester at 400%/min. Results agree.

[2]Made in accordance with the novel process of this invention for the particular type of copolymer, i.e., (A), (B) or (C)

The embodiments of the invention in which an exclusive property or privilege is claimed are defined as follows:

1. A copolymer derived from pivalolactone and a diene selected from the group consisting of isoprene and butadiene, said copolymer being of the formula

(A)

wherein $l$ and $n$ are about 5 to 4,000 and $m$ is about 25 to 25,000, and wherein the molecular weights of the polypivalolactone segments are about 500 to 400,000 and the molecualr weights of the polydiene segments are about 1300 to 1,700,000, said copolymer being further characterized by having a melt index of zero at 180° C and at least 2.0 at 250° C.

2. A copolymer according to claim 1 wherein $l$ and $n$ are 15 to 200 and $m$ is 100 to 5,000.

3. A copolymer according to claim 1 wherein the diene unit is isoprene.

4. A copolymer according to claim 1 wherein the diene unit is butadiene.

5. An exercised copolymer according to claim 1.

6. An article of manufacture comprising the copolymer of claim 1.

7. An article according to claim 6 in the form of a fiber.

8. An article according to claim 6 in the form of a film.

9. An aritcle according to claim 6 in the form of a molded object.

* * * * *